United States Patent [19]
Malarz et al.

[11] Patent Number: 5,201,618
[45] Date of Patent: Apr. 13, 1993

[54] METHOD FOR MACHINING AN ELLIPITICAL BORE

[75] Inventors: Antoni J. Malarz, Troy; Michael J. Brink, Shelby Township, Macomb County; Richard D. Specht, Auburn Hills, all of Mich.

[73] Assignee: General Motors Corporation, Detroit, Mich.

[21] Appl. No.: 764,310

[22] Filed: Sep. 24, 1991

[51] Int. Cl.$^5$ .............................................. B23C 3/00
[52] U.S. Cl. .................................. 409/132; 408/1 R; 409/143; 409/199
[58] Field of Search ............... 408/1 R, 709; 409/131, 409/132, 199, 201, 143

[56] References Cited

U.S. PATENT DOCUMENTS

| | | | |
|---|---|---|---|
| 2,728,268 | 12/1955 | Clifton et al. | 409/199 |
| 2,926,570 | 3/1960 | Bowen | 409/199 |
| 3,289,501 | 12/1966 | Dubrovin | 409/132 |
| 4,245,939 | 1/1981 | Sear | 409/199 |

FOREIGN PATENT DOCUMENTS

| | | | |
|---|---|---|---|
| 557878 | 5/1977 | U.S.S.R. | 408/1 R |
| 1634725 | 3/1991 | U.S.S.R. | 408/1 R |

Primary Examiner—Daniel W. Howell
Attorney, Agent, or Firm—Patrick M. Griffin

[57] ABSTRACT

A method is disclosed for finishing a roughly shaped elliptical cylinder bore to an accurate final shape of predetermined major and minor axis. A circular cutter body with an effective diameter equal to the desired major axis. Then, a tilt angle is determined at which, when the circle of the cutter body is tipped away from the bore axis with the bore axis running through the center of the circle, a projection of the circle into a plane perpendicular to the bore axis will yield the desired minor axis. Then, the cutter body is powered about a secondary axis, at the tilt angle, relative to a bore primary axis and advanced linearly into the bore along the bore axis.

3 Claims, 2 Drawing Sheets

METHOD FOR MACHINING AN ELLIPTICAL BORE

This invention relates to machining in general, and specifically to an improved method for machining an axial bore of predetermined size into a workpiece.

BACKGROUND OF THE INVENTION

Almost all holes or bores that are drilled or machined into a workpiece are circular in cross section, for the obvious reason that a rotating drill or cutter describes a circle. There are specialty tools, such as a drill that cuts a hole of rectangular cross section, but these do not have wide application, since there is little call for bores of anything but circular cross section. There may, however, be a significant need in the future for a method to accurately and efficiently machine a bore of oval or elliptical cross section. Some promising research has indicated that an engine cylinder bore with such a shape might be a very cost effective way of packaging more combustion chamber volume within a given engine block size. In effect, the circular cross section of the cylinder bore is elongated, providing more bore volume without enlarging the block.

It is far more difficult to cut an elliptical surface than a circular one. While the bore can be cast initially to near net shape, it still has to be machined out to an accurate final shape. One known method consists of orbiting a cylindrical milling cutter around in the desired pattern inside the rough bore. Because such a tool has to be significantly smaller in diameter than the bore, but just as long, it is subject to flexing. Such a process is also slow. Broaching to final shape is also a possibility. Though accurate, a broaching process is inherently slow and expensive, and broaching a blind or closed bottomed hole, such as a cylinder bore, would be very difficult. Broaches are generally designed to be pushed or pulled all the way through the hole they are shaping.

SUMMARY OF THE INVENTION

The invention provides a method for machining a bore to a final surface of predetermined elliptical cross section that is both quick and accurate.

A circular cutter body is provided with a plurality of evenly spaced, insert type cutters that have an effective diameter equal to the major axis of the desired ellipse. Then, an angle is determined at which a circle with a diameter equal to the cutter body effective diameter would have to be tilted so that a projection of the tilted circle into a plane perpendicular to the bore axis would yield an ellipse with the desired minor axis. The outer wall of the cutter body, behind the insert cutters, is cut away and relieved by more than the tilt angle so that it can be rotated inside the bore, at the tilt angle, and still clear the inner surface of the bore. In addition, the side edges of the insert cutters are tipped in from the axis of the cutter body by slightly more than the tilt angle, so that only the very outermost corners of the cutter will contact the inner surface of the bore.

An apparatus is disclosed that is used to rotate the cutter body, inside the bore, at the calculated tilt angle. This includes a rotatable main shaft that is linearly movable along the axis of the bore by a standard milling machine. A specially designed housing holds a short secondary shaft so that it can rotate at the calculated tilt angle relative to the main shaft. Bevel gears mate the two shafts, and the cutter body is fixed to the secondary shaft to rotate therewith. The main shaft is then powered and advanced to drive the tilted, rotating cutter body down into the rough bore. The size and tilt of the cutter body assure that the insert cutters machine the bore to an accurate, final elliptical shape with the desired major and minor axes, in one pass. The solid cutter body and the even, diametrically opposed orientation of the insert cutters assures that the cutting forces are even and well absorbed, with no significant deformation of the cutter body to jeopardize accuracy.

It is, therefore, a general object of the invention to provide an improved method for machining a bore of elliptical cross section.

It is another object of the invention to provide such a method that operates quickly, in one pass, and with superior accuracy.

It is another object of the invention to provide such a method in which a substantially solid, circular cutter body is tilted at the proper angle to create an ellipse in which the effective cutting diameter of the cutter body creates the desired major axis of the ellipse and a projection of the effective diameter creates the desired minor axis of the ellipse.

It is another object of the invention to provide an apparatus with which to practice the method.

DESCRIPTION OF THE PREFERRED EMBODIMENT

These and other objects and features of the invention will appear from the following written description, and from the drawings, in which.

Figure 1:
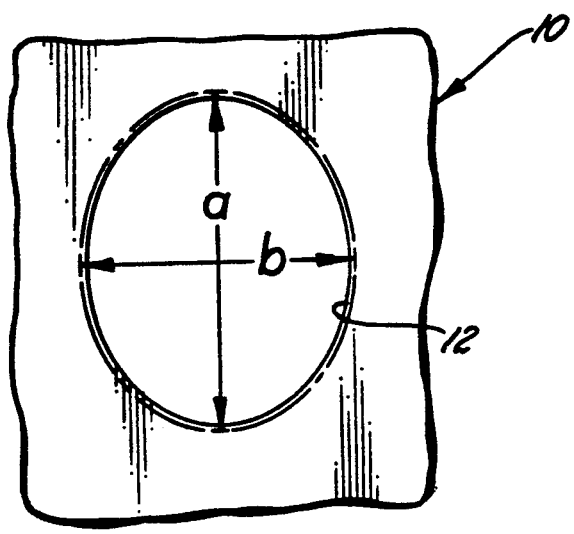
FIG. 1 is a plan view of a workpiece showing an initial, cast to size bore in solid line and showing the dimensions and shape of the desired final shape in dotted line.

Referring first to FIG. 1, a workpiece, in this case an engine block indicated generally at 10, has a roughly shaped elliptical bore 12 precast into it. Like any surface in a cast block that has to move past another part, the rough formed bore 12 has to be machined down to a final shape more accurate than that which the casting process alone can provide. The desired final shape is shown in dotted lines, which is an ellipse of predetermined major (longer) axis a and minor (shorter) axis b. The designer would determine, in each particular case, the largest ellipse that would fit into the space available within the engine block. Then, the major and minor axes a and b would be determined from the standard ellipse formula. The axes a and b desired for the final, finished surface of bore 12 disclosed here are 79 mm. and 62.5 mm. respectively, but that would obviously vary for every unique case. Once determined, the size and orientation of the tool that will create the desired shape is calculated, as is described next.

Figure 2:
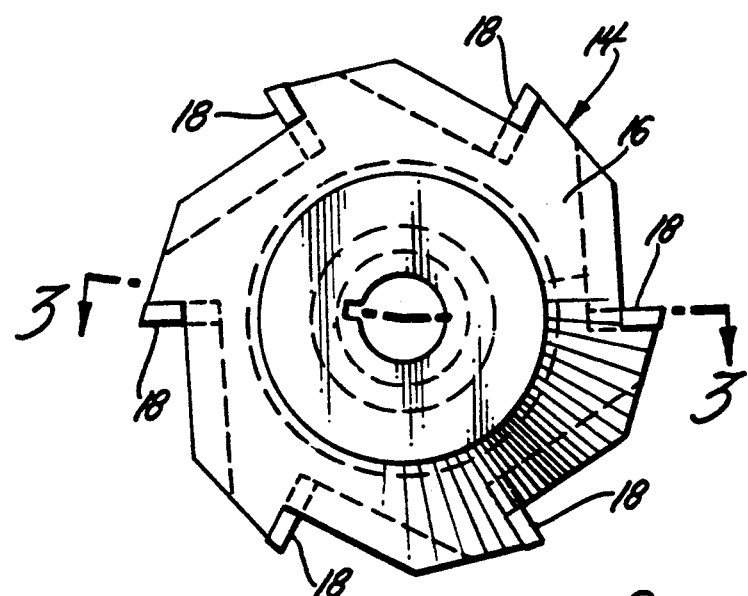
FIG. 2 is a plan view of the cutter body alone.
Figure 3:
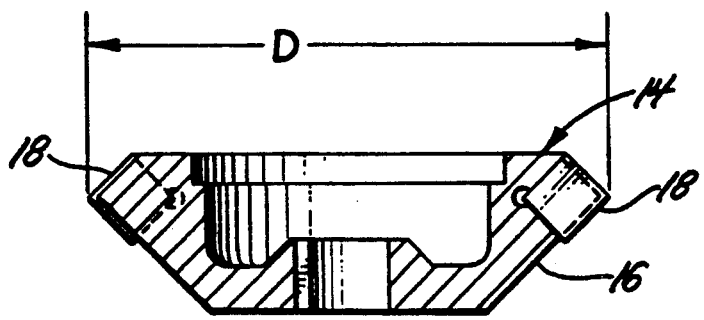
FIG. 3 is a cross section of the cutter body taken along the line 3—3 of FIG. 2.

Referring next to FIGS. 2 and 3, a substantially solid cutter body, indicated generally at 14, is machined out of a suitable tool quality steel, in a generally annular shape. Unlike the cutter bodies of conventional face milling cutters, however, cutter body 14 has a significantly larger central bore, because it will not be fixed directly to a single rotating shaft, and will have to accommodate additional structure described below. Another difference is that the side wall 16 is cut away and relieved at approximately a 45 degree angle. Mounted around the perimeter of cutter body 14 are six evenly spaced insert type cutters 18, which are commercially available carbide cutters that are ⅜ inch square, ⅛ inch thick, and which are chamfered on the leading edge to create relieved cutting corners. The cutters 18 are fixed in matching pockets by conventional attachment means, oriented with substantially neutral axial and radial rake angles, and tipped approximately 45 degrees relative to the central axis of cutter body 14. Conventional face milling insert cutters would be mounted with a top corner standing clear of the upper surface of the cutter body. Here, the upper corner of each insert cutter 18 is basically flush with the upper surface of the cutter body 14, because it does not act as the cutting corner. Instead, each side corner stands clear of the cutaway side wall 16, and serves as the active, cutting corner. The effective diameter D of the cutter body 14 is, therefore, measured between the diametrically opposed side corners of the cutters 18, and is set to be substantially equal to the desired major axis a, 79 mm. here.

Figure 4:
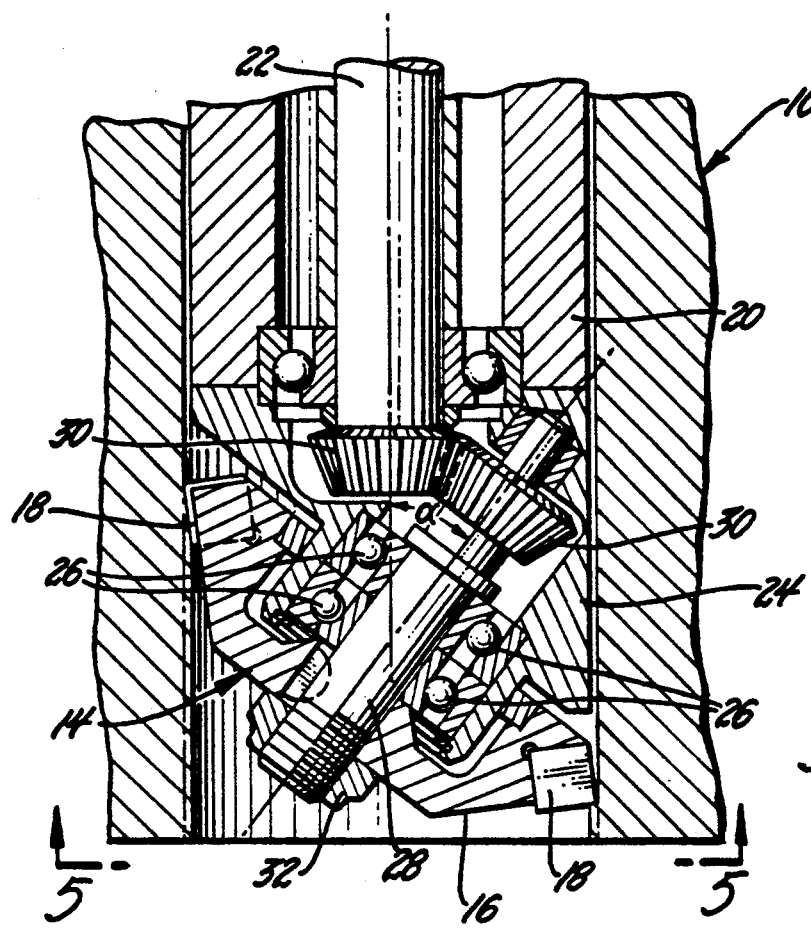
FIG. 4 is a cross section of the cutter body, the apparatus, and the cylinder bore as the cutter body advances through the bore, showing two shafts in elevation.
Figure 5:
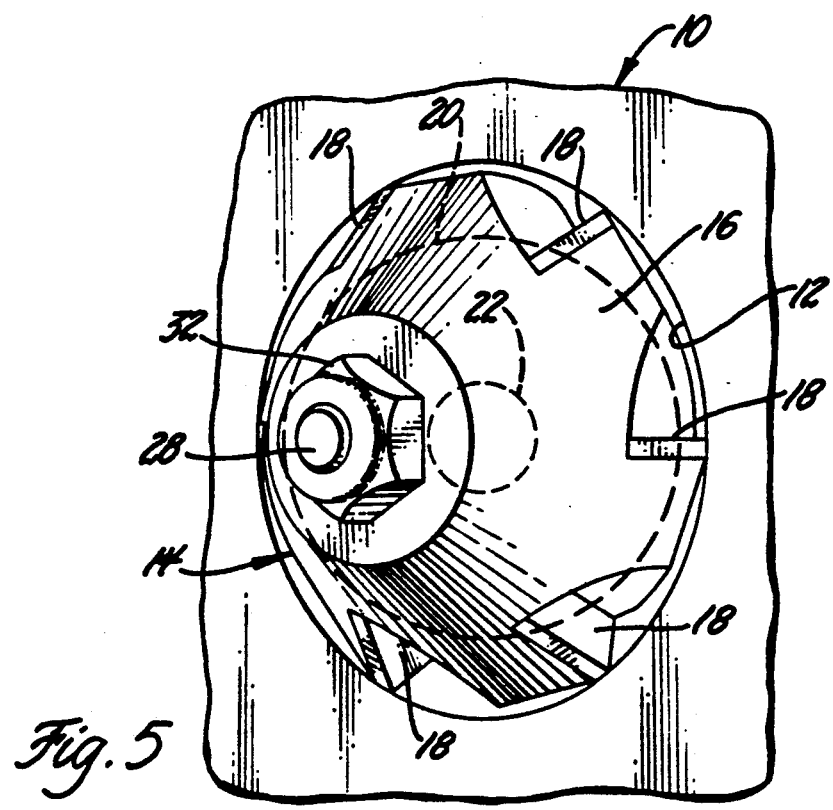
FIG. 5 is a view taken along the plane 5—5 of FIG. 4.

Referring now to FIGS. 4 and 5, the next step, after setting the effective diameter of the cutter body 14, is to determine a tilt angle for the cutter body 14. The tilt angle, indicated at $\alpha$, is defined as that angle at which a projection of the effective diameter D into a plane perpendicular to the axis of bore 12 will equal the desired minor axis b. In other words, one solves $\cos(\alpha) \times D = b$ for $\alpha$, D and b being known. By the term "tilt angle" it is meant that the center axis of the bore 12 extends through the center of the circle formed by the cutting corners of the insert cutters 18, but the plane of that circle is not perpendicular to the axis of bore 12. In the embodiment disclosed, the tilt angle $\alpha$ is approximately 37.9 degrees. The reasoning behind this can be seen best in FIG. 5. A circle, when tilted and projected into the plane from which it was tilted, produces an ellipse, the major axis of which is the diameter of the circle, and the minor axis of which is as defined above. If the cutter body 14 can be rotated at that tilt angle and simultaneously advanced along an axis, it will machine a bore along that axis of the desired shape. The apparatus to do that is described next.

Referring again to FIG. 4, an apparatus to operate cutter body 14 consists of a rigid cylindrical housing 20 which is made large enough to fit into bore 12 and move coaxially to and through it with minimal radial clearance. Supported coaxially within housing 20 is a rotatable main shaft 22, which would in turn be powered by a conventional milling machine, not illustrated. The milling machine would also have a conventional slide capable of linearly advancing housing 20 and main shaft 22 at any desired feed rate. At the end of housing 20, a projecting cylindrical nose 24 is defined about a central axis that intersects the axis of main shaft 22 at the same angle as the calculated tilt angle $\alpha$. Supported within nose 24 by a pair of angular contact bearings 26 is a shorter, secondary shaft 28. A pair of mating bevel gears 30 translate the rotation of main shaft 22 to secondary shaft 28. Secondary shaft 28 and the bevel gears 30 are made compact enough not to extend outside of the space envelope of main housing 20. Finally, cutter body 14 is non-turnably fixed to the end of secondary shaft 28 with a locking nut 32, in surrounding relation to the bearings 26.

Referring next to FIGS. 1, 4 and 5, the boring process may be easily understood. As main shaft 22 spins about its axis, cutter body 14 is simultaneously rotated about a secondary axis at the tilt angle $\alpha$. Consequently, as housing 20 is advanced coaxially toward the bore 12, the cutting corners of the insert cutters 18 describe an ellipse of the desired shape, as projected into a plane perpendicular to the co-axis of shaft 22 and bore 12. Ultimately, the cutter body 14 and the insert cutters 18 enter the rough bore 12, machining its inner surface down from the solid to the dotted line configuration of FIG. 1. Because the tilt angle $\alpha$ of 37.9 degrees is smaller than the 45 degree angle at which the insert cutters 18 are tipped relative to the axis of the cutter body 14, there is a clearance between the outer edges of the insert cutters 18 and the inner surface of the bore 12. Cutter body 14 would be advanced at the highest linear rate feasible, given the material to be machined and the cutter wear rate that can be tolerated. Unlike known boring processes, a one pass, straight line advance of the tool is all that is needed. The cutter body 14 is much stiffer, in a direction perpendicular to the axis of bore 12, than is a slender, orbiting tool, and the cutting forces on the insert cutters 18 are well balanced, at least after all have entered the bore 12. Therefore, the process produces a finished surface of superior accuracy. It also operates much more quickly than a successive pull broaching operation. If desired, a second pass can be made after turning the cutter body 180 degrees, so as to bring the finished surface closer to the bottom of bore 12.

Some variations in the disclosed process and apparatus could be made. Generally, it will be most practical to precast, or rough machine, an initial bore 12 to near net size, rather than using the cutter body 14 to machine the entire bore out of a solid block. That potential exists, although a cutter body 14 would have to be provided in which the cutting corners of the insert cutters 18 all axially led the rest of the cutter body, which would be difficult. Other circular cutter bodies can be imagined having a more finally defined circular cutting edge, as opposed to the six discrete insert cutters 18. Any circular cutter of the right diameter and sufficient relative hardness operated at the tilt angle described would work. The insert cutters 18 are off the shelf items, however, which is an advantage in terms of lowering the cost of the apparatus. Other apparatuses could be devised that would spin the circular cutter at the proper tilt angle, using cable or hydraulic drives, for example. The shafts 22 and 28 and the gears 30 are a relatively simple and direct mechanical drive means, and work well so long as the size of the bore is large enough to accommodate them. More exotic drive means might be needed in smaller bores. Therefore, it will be understood that it is not intended to limit the invention to just the embodiment disclosed.

The embodiments of the invention in which an exclusive property or privilege is claimed are defined as follows:

1. A method of machining an axially extending surface having an elliptical cross section of predetermined major and minor axis on a workpiece, comprising the steps of;

providing a circular cutter body with an effective diameter substantially equal to said predetermined major axis, determining the tilt angle at which said cutter body must be oriented relative to the axis of said workpiece surface so that a projection of said effective diameter into a plane perpendicular to said workpiece surface axis creates said predetermined minor axis, providing a drive means sized to fit within said projection with radial clearance while rotating said cutter body at said tilt angle, and, advancing said drive means along said workpiece surface axis while simultaneously rotating said cutter body at said tilt angle.

2. A method of machining an axial bore with an elliptical cross section of predetermined major and minor axis into a workpiece, comprising the steps of;

providing a circular cutter body with an effective diameter substantially equal to said predetermined major axis, determining the tilt angle at which said cutter body must be oriented relative to the axis of said bore so that a projection of said effective diameter into a plane perpendicular to said axis creates said predetermined minor axis, and, providing a drive means sized to fit within said projection with radial clearance while rotating said cutter body at said tilt angle, advancing said drive means into said workpiece along the axis of said bore while simultaneously rotating said cutter body at said tilt angle.

3. A method of machining an axial bore with an elliptical cross section of predetermined major and minor axis into a workpiece, comprising the steps of;

rough forming an initial axial bore in said workpiece with substantially the desired elliptical cross section, providing a circular cutter body with an effective diameter substantially equal to said predetermined major axis, determining the tilt angle at which said cutter body must be oriented relative to the axis of said bore so that a projection of said effective diameter into a plane perpendicular to said axis creates said predetermined minor axis, providing a drive means sized to fit within said axial bore with radial clearance while rotating said cutter body at said tilt angle, and, axially advancing said cutter body into said rough formed bore while simultaneously rotating said cutter body at said tilt angle.

* * * * *